United States Patent [19]
Braun

[11] Patent Number: 5,959,295
[45] Date of Patent: Sep. 28, 1999

[54] TIMING DEVICE AND METHOD FOR POSITIONING NON-LINEAR MACHINE PARTS

[76] Inventor: Paul-Wilhelm Braun, Lindlau Str. 23, D-53842 Troisdorf, Germany

[21] Appl. No.: 08/903,200

[22] Filed: Jul. 15, 1997

[30] Foreign Application Priority Data

Jul. 17, 1996 [DE] Germany .......................... 196 28 765

[51] Int. Cl.$^6$ .................................................. G01B 11/02
[52] U.S. Cl. ...................... 250/237 G; 33/706; 356/395; 250/231.16
[58] Field of Search ........... 33/706; 250/231.13–231.18, 250/237 G, 566, 568; 356/25, 28, 375, 395; 428/195

[56] References Cited

U.S. PATENT DOCUMENTS

| | | |
|---|---|---|
| 3,671,750 | 6/1972 | Heitmann et al. ........................ 356/169 |
| 4,145,608 | 3/1979 | Shirasaki et al. . |
| 4,158,509 | 6/1979 | Rieder et al. . |
| 4,952,874 | 8/1990 | Stadtfeld . |
| 5,508,088 | 4/1996 | Braun . |

FOREIGN PATENT DOCUMENTS

| | | |
|---|---|---|
| 385 355 B | 8/1987 | Australia . |
| 0 349 792 | 1/1989 | European Pat. Off. . |
| 27 30 715 | 2/1978 | Germany . |

*Primary Examiner*—Stephone Allen
*Attorney, Agent, or Firm*—Collard & Roe, P.C.

[57] ABSTRACT

A method and device for positioning non-linear machine parts using a timing element, particularly for machine parts that are in non-linear motion. The invention has a pair of sensors spaced apart for reading bar code marks on the timing unit when the timing unit is disposed on a circular or spherically-shaped carrier surface. Where long surfaces are involved, the ends of the timing unit or clock ruler are butt-jointed together and include a gap having a width deviating from the window openings of the bar code. Thus, the second sensor, which is connected to a second comparator, contains a test circuit for the code signals that are received. When the code signals do not correspond to the width of the bar code pitch, they are passed over to a second counter, and the first counter is disconnected from the line. In addition, a comparator connected to the second sensor also contains a test circuit for the window openings of the timing element so that the code signals are connected to a transfer or storage unit when not conforming to the width of the pitch of the code marks. The transfer unit transfer the signals added up and received from the second counter to the first counter.

4 Claims, 4 Drawing Sheets

TIMING DEVICE AND METHOD FOR POSITIONING NON-LINEAR MACHINE PARTS

BACKGROUND OF THE INVENTION

1. Field of the Invention

This invention relates to a method and device for positioning non-linear, rotating machine parts, whereby an optical light signal, transmitted by an emitter, is received by a sensor via a timing or clock ruler, or element provided with bar code marks, and the sensor transmits an electrical signal pulse to a counter in response to the bar code marks.

2. The Prior Art

A device of the above type is disclosed in the applicant's earlier U.S. Pat. No. 5,508,088, in which the clock ruler consists of a transparent material, on which code marks are disposed thereon for scanning by optical sensors.

SUMMARY OF THE INVENTION

It is possible to provide the transparent material with a reflective coating on the side facing away from the emitter, so that light beams transmitted by the emitter are reflected along the optical axis and are recorded by a receiver, which then transmits a pulse to a control circuit for controlling the rate of feed of a moving machine part.

The length and frequency of the pulses are determined by so-called "window openings," which are created by the code formed on the clock ruler in the form of fields, denoted either as "transparent to light or opaque to light." The light beam exiting from the emitter is converted thereby into a pulse by a receiver disposed on the optical axis of the light beam. The type of pulse received is dependent upon the quality and spacing of the window opening.

Because of the high accuracy required for determining the position of moving machine parts, code marks for timing or clock rulers had to be produced heretofore in one piece, using expensive production machines. The product costs also rise exponentially since maintaining tight manufacturing tolerances becomes more costly with the increase in manufactured ruler lengths.

Timing or clock rulers with a finite length are normally used for controlling the head of a printer, a robotic arm, or a workpiece carriage. Moreover, applications where rotating machine parts have to be controlled by timing elements are also gaining in importance.

Therefore, an object of the invention is to provide a curved timing element or clock rulers having greatly improved manufacturing accuracy.

Another object of the invention is to provide clock rulers shaped in the form of an arc on the circumference of a disk, cylinder, or a spherically shaped body.

Furthermore, problems also arise when several clock rulers of shorter length are fitted together in series to obtain a new clock ruler or timing element having a correspondingly greater working length, because the adjacent butt edges created in this way may falsify the light signal and lead to inaccuracies in the detection of the position. There is a further problem in that displacement occurs in the coding on the butt edges, which necessarily leads to measurement errors, and consequently to an inaccurate detection of the position.

Therefore, the present invention provides a method and device which permits the detection of the position with curved clock rulers, and across greater ruler lengths when a plurality of clock rulers or timing elements are joined together. The accuracy for detecting the position when using several rulers is to be held to the accuracy that has to be maintained when a uniform clock ruler scale is used.

According to the invention, it has been found that errors due to the butt edges of the clock rulers can be eliminated by using at least two sensors and additional comparator units.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
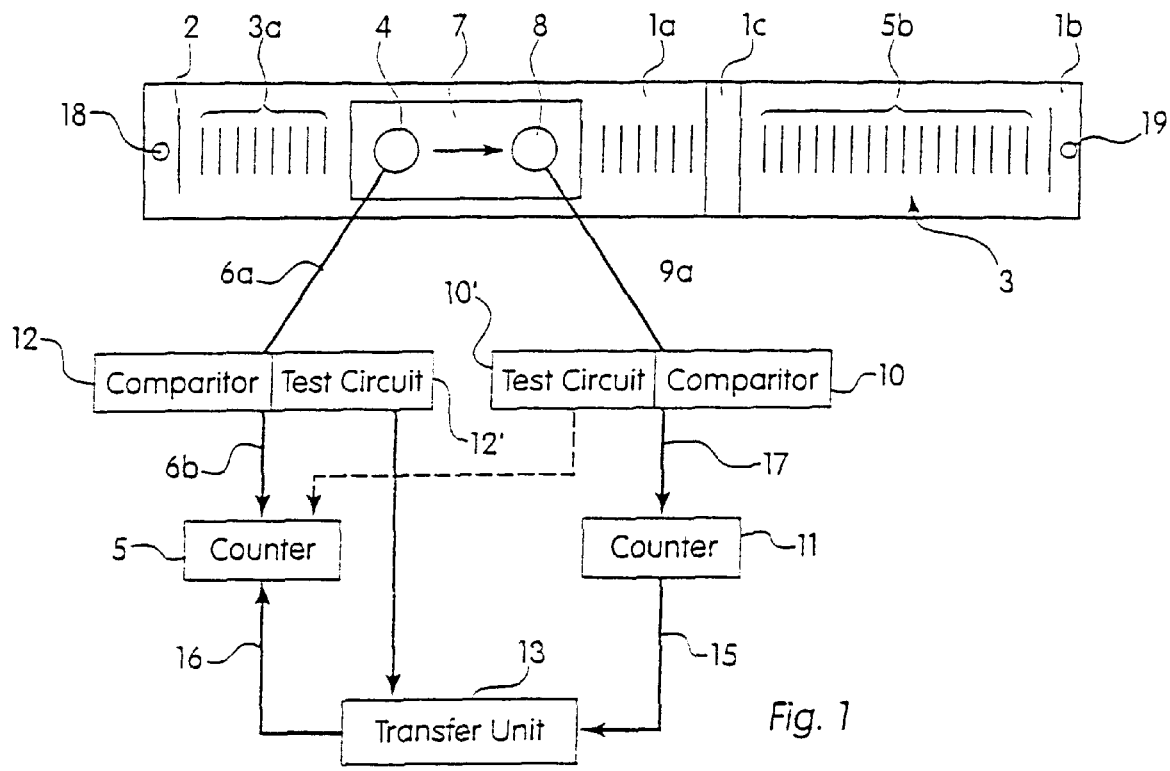
FIG. 1a and 1b are a top view of the device according to the invention, with a moving sensor carriage.

Referring now in detail to the drawings and, in particular, FIG. 1, a device for detecting the position of moving machine parts is shown on one butt edge of a timing or clock ruler, which can be mounted on a cylinder via fasteners 18 and 19. The clock ruler consists of the code carrier segments 1a and 1b with a butt edge 2, whereby each code carrier segment has equally pitched code marks 3a and 3b. A window opening 1c is located in the interface.

There are provided two sensors 4 and 8, in a spaced apart arrangement disposed on a sensor carriage 7. The sensor carriage can be mounted, for example on a printer head, and be guided with the latter across the clock ruler. Sensors 4 and 8 receive optical signals from an optical emitter or light transmitter, which is disposed in the plane of representation of FIG. 1, behind sensor carriage 7, and therefore is not visible.

When the clock ruler moves in the direction of the arrow, shown in sensor carriage 7, both sensors 4 and 8 receive signals in accordance with the code marks passing by the carriage. Sensor 4 is connected to a counter 5 via lines 6a and 6b. Viewed from starting position 2, counter 5 receives and stores scanned code marks 3a.

As soon as sensor 8 has reached window opening 1c, a comparator 10 connected the output of sensor 8 through line 9a recognizes a change in the code mark pitch. This change can be obtained, for example by comparing a test signal with the code signal received. For this purpose, a test circuit 10' is integrated into comparator 10, for providing the test signal to comparator 10 for comparing a normal signal with the signal received from sensor 8.

When test circuit 10' detects that a changed code signal is received via line 9a, counter 5 is stopped and disconnected from line 6b, and a second counter 11 starts counting. Counter 11 is connected to sensor 8 via line 17 from comparator 10. This means that when sensor carriage 7 moves across the contact point of the two code carriers 1a and 1b, the code signal is no longer stored and counted in counter 5, but the code now is counted by counter 11.

When changing from one clock ruler segment to the other, any error deviation is simultaneously detected by comparing the measured code signal with the test signal. Thus, the error is eliminated by a uniform distribution over the total code mark segments present. This results in a continuous timing sequence as if only one clock ruler without an error point were present. This is explained in greater detail in connection with FIGS. 3a and 3b.

Figures 3A, 3B:
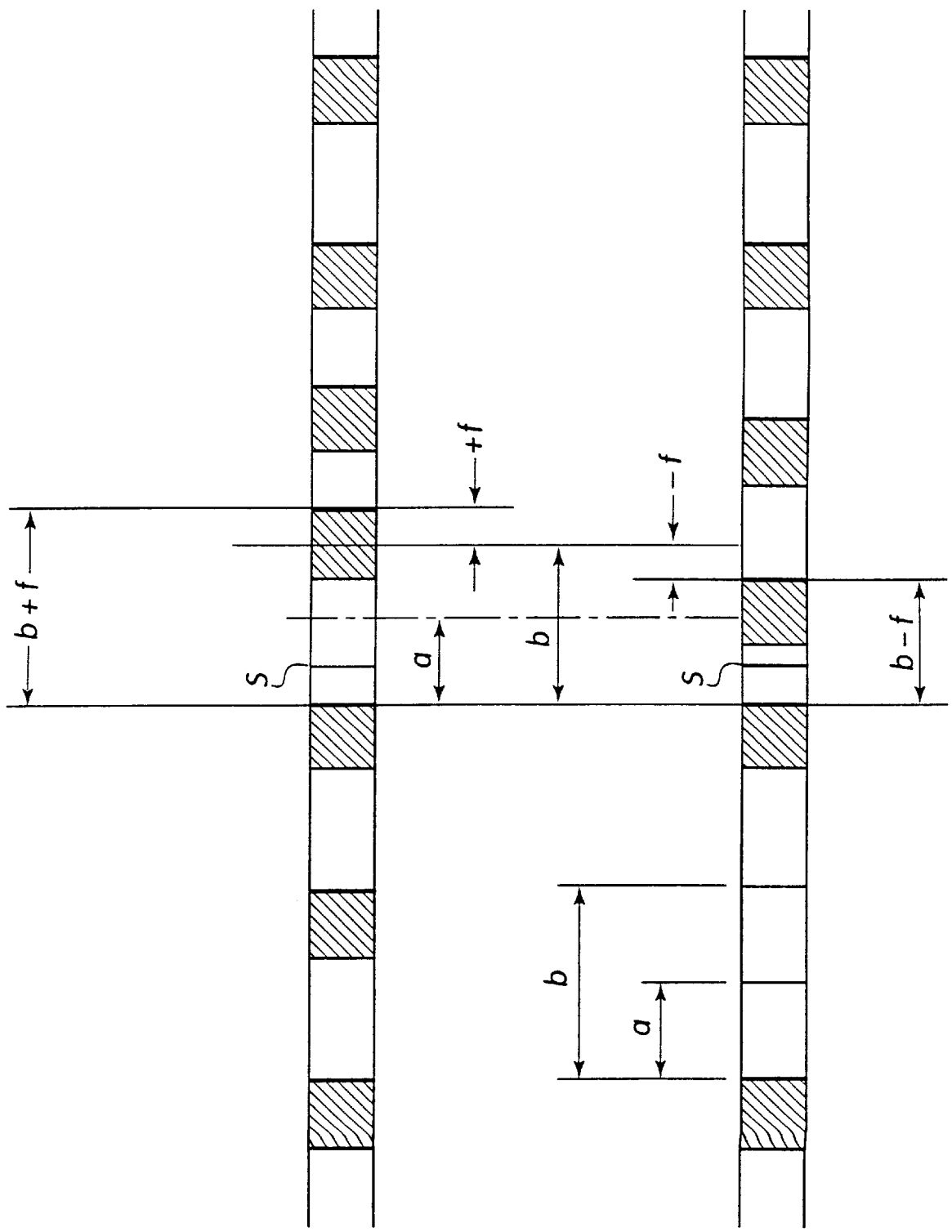
FIGS. 3a and b show error detection for a curved segment of the clock ruler.

In FIG. 3a, interface "S" is placed in such a way that an error +f is created. Code mark pitch "b" is increased hereby by value +f, so that after interface "S" has passed, the value for the code counter has to be increased by +f, so that the connection error is compensated for.

In FIG. 3b, interface "S" is placed in such a way that an error −f is produced. Code mark pitch "b" consequently has to be reduced by −f to compensate for the connection error. By adding or subtracting error quantity "f", the value of the respective counter is thus corrected when changing from clock ruler 1 to clock ruler 2.

As sensor carriage 7 continues to move across window opening 1c as in FIG. 1, sensor 4 receives a changed code signal as well. This code signal, however, does not correspond with the test signal sent to comparator 12 by test circuit 12' associated with the sensor. At this instant, counter 11 is stopped, and the signals previously added up by the counter are passed on to counter 5 via a transfer unit 13, counter 5 now being restarted to resume its counting of the timing marks. After window opening 1c has been passed, counter 5 thus determines the exact position of the moving machine part, such as for example a printer head. Counting can now be continued. With a new timing ruler, the new coding is detected by sensor 8, and the error is then compensated by calibration.

The movements of a cylindrical machine part such as, for example a shaft, hollow cylinder, or a driving gear are thus detectable. For this purpose, curved clock rulers can be mounted on the circumference of a cylindrical part, and monitored via radially arranged sensor units for positioning. If the cylindrical part has a larger circumference, a plurality of timing rulers can be arranged in a series, one after the other. These sensors, which are arranged one after the other in the running direction, are then switched as described in the preceding example.

The accuracy of the device according to the invention can also be enhanced in that during the start-up and braking of sensor carriage 7, a test signal is provided for the start-up and braking phases, such test signal being changed accordingly. The purpose of this is to prevent code signals received during acceleration, because of their changed structure from being interpreted as an indication of a change of code carriers.

Figure 1A:
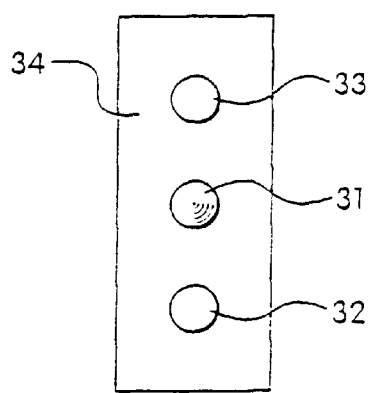

FIG. 1a shows a top view of a sensor carriage 34. According to another design of the sensor/emitter unit, optical emitter 31 is arranged between sensors 32 and 33 on transport carriage 34. In this case, the code carriers are provided with a reflective coating, so that the signals transmitted by emitter 31 are reflected and received by sensors 32 and 33 at an angle.

Figure 1B:
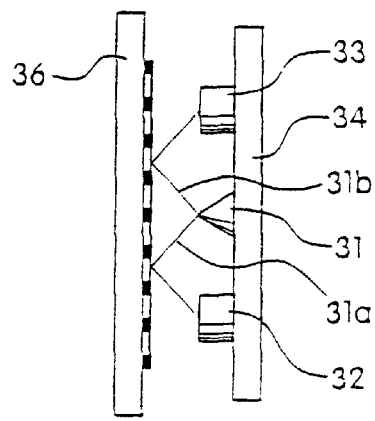

FIG. 1b shows the example of FIG. 1a in cross section through a clock ruler 36 and sensor carriage 34. Light beams 31a and 31b transmitted by emitter 31 are reflected on the surface of clock ruler 36, the surface being provided with dotted markings 35, and received by sensors 32 and 33. An arrangement comprising a plurality of sensors is also feasible.

Figure 2:
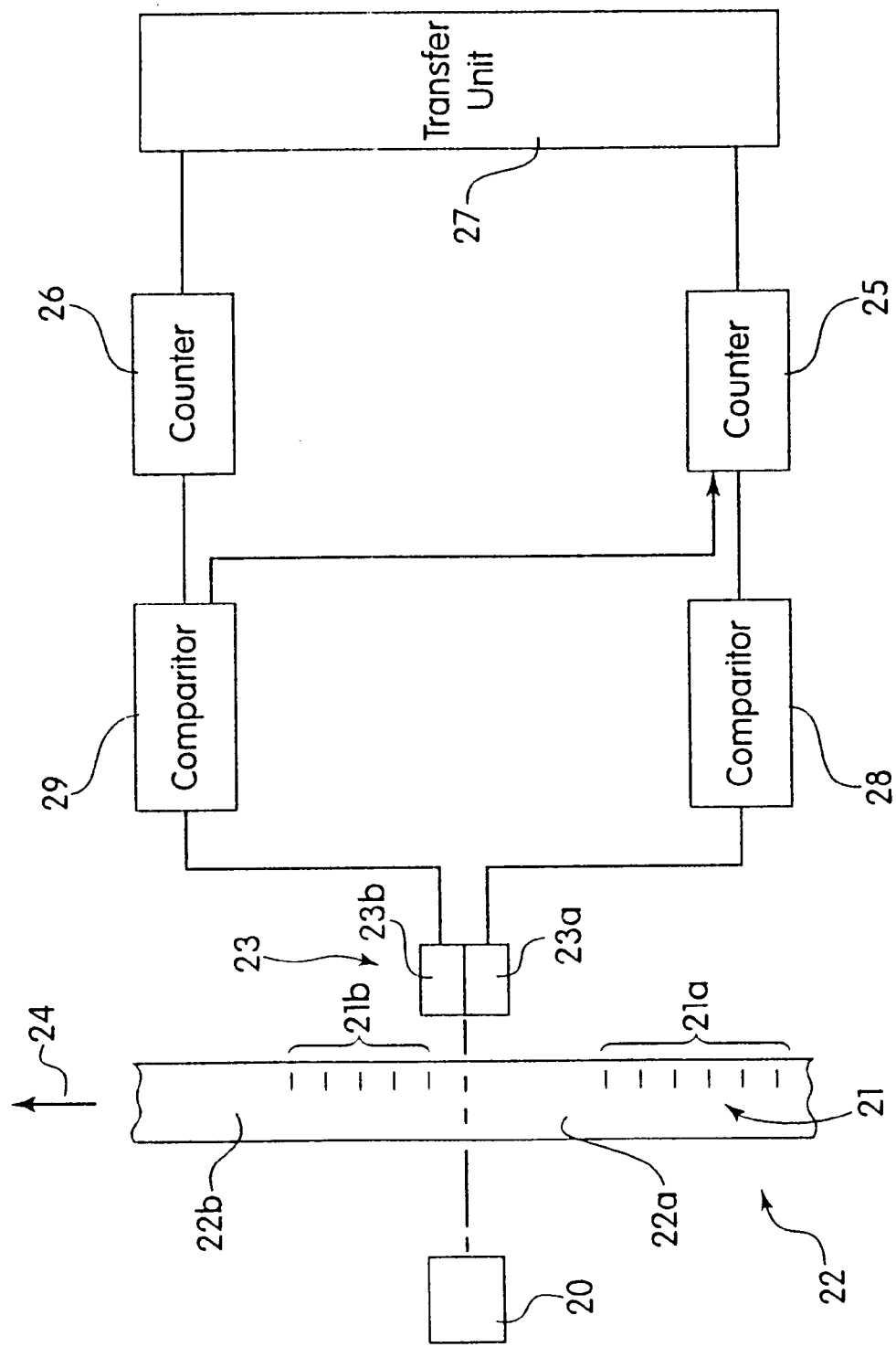
FIG. 2 is a sectional view of part of the device according to the invention, with a moving segment of the clock ruler.

Referring to FIG. 2, there is shown a moving clock or timing ruler 22 with different bar codes 21. An optical signal emitted by optical emitter 20 is received by a sensor 23, which then transmits an electrical timing signal to a counter in accordance with the bar code mark.

Timing ruler 22 has two clock ruler segments 22a and 22b, which are provided with misaligned bar code marks 21a and 21b. In a way similar to the preceding example, sensor unit 23 consists of two individual sensors 23a and 23b, which are arranged one after the other in the direction of travel of the timing ruler.

Sensor 23b, which is the leading sensor in the direction of movement, shuts off a counter 25 of the first sensor 23a when it reaches a new clock ruler segment 21b, and then counts the bar code marks 21b of the new clock ruler segment 22b. The counted segments are then stored in a transfer unit 27.

As soon as first sensor 23a has reached a new clock ruler segment 21b as well, counter 26 of second sensor 23b is then stopped. First counter 25 then restarts or continues counting, whereby the signals passed on by the second counter 26 and stored in transfer unit 27 are added to the content of first counter 25.

To improve the signal flow, comparators 28 and 29 are connected to the individual sensors 23a and 23b in front of counters 25 and 26. These comparators are capable of detecting changes in the bar code marks by comparison with test signals, and can trigger at the same time, the switching circuits of counters 25 and 26, and transfer unit 27 as required.

The operational switching sequence described above is effective not only in one, but in both directions of movement. It is important in this connection that sufficient switching time be available to the sensors, so that no window opening passes by the sensor without being detected and compensated for.

For machine parts moving at high speed with high accelerations, it is necessary to arrange the sensors so that they are spaced apart by several bar codes. Empirical values show that the sensors should have a spacing of at least three bar codes, so that the operational sequence for position detection can be executed in a reliable manner.

Figure 4A:
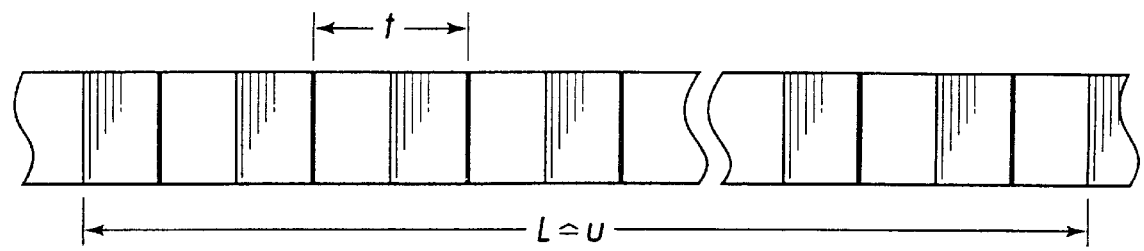
FIG. 4a shows a detail of the clock ruler.
Figure 4B:
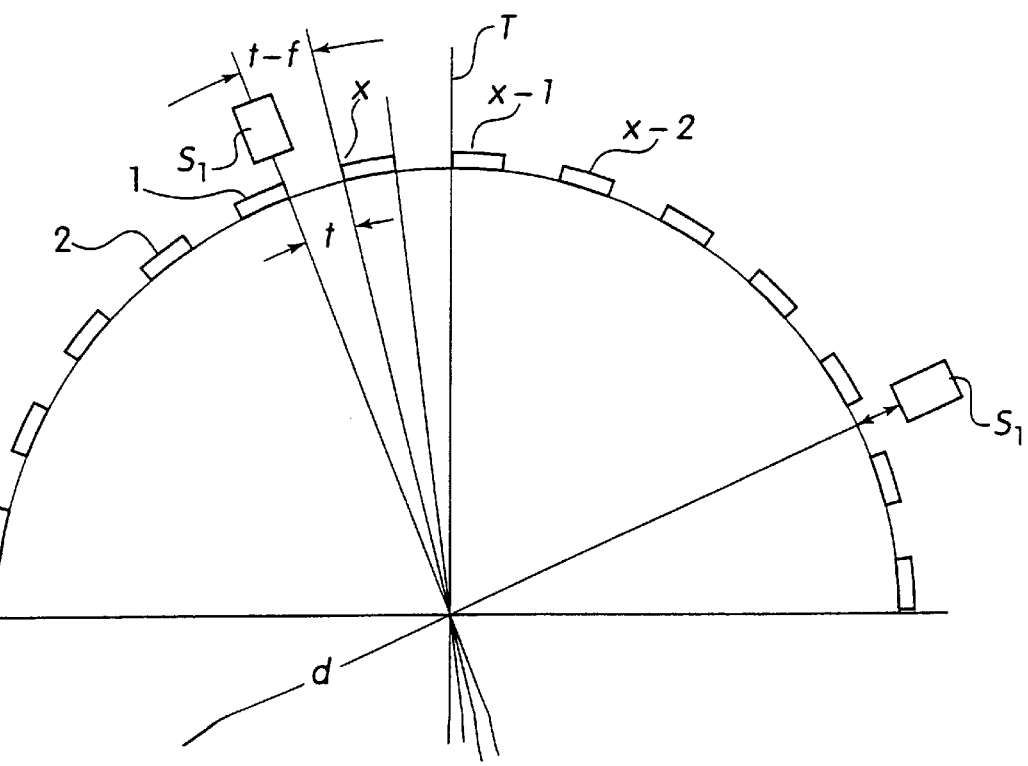
FIG. 4b is a sectional view showing the ruler of FIG. 4a disposed on a semicircular surface.

Referring to FIG. 4a and 4b, there is shown a timing unit or clock ruler that is disposed over a semi-circular surface. In the example of FIGS. 4a and 4b, X=36 bars as preset value O=defined from the starting point t=printed division t±f=last division with an error "f" in "+" or "−"

T=possible gap in case of tolerance—surface of the shaft not reflecting.

It is the objective to have an absolute positioning so that ±f has to be divided or prorated for each step shown.

Accordingly, while only a few embodiments of the present invention have been shown and described, it is obvious that many changes and modifications may be made thereunto without departing from the spirit and scope of the invention.

What is claimed is:

1. A device for detecting the position of rotating machine parts in response to an optical transmitter, comprising:

at least one code carrier mounted on the machine part and having a plurality of timing elements mounted thereon, said elements having code marks with equally spaced transparent and opaque windows, the ends of said elements being joined in a butt joint having a gap, the width of the gap deviating from said window opening;

a sensor carrier having first and second optical sensors mounted thereon for scanning said code marks;

first and second comparators coupled respectively to said first and second sensors;

first and second counters coupled to said first and second comparators for counting the code marks of the timing elements of the code carrier;

first and second test circuits coupled respectively to said first and second comparators for providing test signals to said respective comparators, said test signals corresponding to a normally scanned code signal;

a transfer unit coupled to the output of said second counter, and the input of said first counter;

said second comparator comparing the received code signals with said second test circuit signal for conformity with said scanned window openings so that if the code signals do not correspond with the width of the pitch of the code mark and have an error deviation, said second test circuit stops said first counter and turns on said second counter to continue counting said code marks, and if the code signals of said first comparator do not correspond with the width of the pitch of the code mark and have an error deviation, said code signals are transmitted to said transfer unit from said second counter, said transfer unit passing the summed signals received from said second counter to said first counter so that said first counter is reconnected to said first sensor for receiving new signals from said first sensor, the error of said total count being compensated for by calibration, so that said first counter determining the exact position of the moving machine part.

2. Device for detecting the position of rotating or cyclically moving machine parts, comprising:

a code carrier designed as a timing element, said code carrier having a plurality of code marks equally spaced as window openings;

first and second sensors for scanning the code marks on said timing element;

a first counter having a comparator and test circuit and coupled to said first sensor;

a second counter coupled to said second sensor;

a transfer unit coupled to said first and second counters;

a comparator coupled to said second sensor and containing a test circuit for monitoring the code signals received, so that when the code signals are changed, said first counter is disconnected, and said comparator is connected to said second counter so that when the changed signal is received, said second counter is switched off by said first sensor, and the signals stored in said second counter are connected to said transfer unit, the latter combining the result of the code signals previously added in said first counter with the signals transferred from said second counter.

3. A method for detecting the position of moving machine parts, comprising the steps of;

providing an optical signal from an optical transmitter onto a timing element provided with bar code marks;

mounting the timing element on a rotatable cylinder;

providing the timing element with at least two bar code marks;

sensing the optical signal passing through or reflected from the timing element by separated first and second sensors, counting by way of an electronic counter the electrical timing signal sensed by the sensor;

positioning said first sensor to be leading in the direction of movement of the rotatable cylinder;

locating said second sensor adjacent to the first sensor so as to be opposite to the direction of movement of the cylinder;

connecting said first sensor to a first counter for counting the bar code marks on the timing element; and connecting said second sensor to a second counter for counting the bar code marks of said timing element so that when said first sensor, reaches a new timing element segment, said second sensor shuts off said first counter and counts and stores the bar code marks of the new clock segment until said first sensor also reaches the timing element, and then shutting off said second counter connected to said second sensor, whereby said first counter continues counting and receives the timing signal previously stored by said second counter.

4. The method as recited in claim 3, additionally comprising:

a transfer unit coupled to said first and second counters so that when the first counter is disabled said second counter connected to said second sensor is switched on to continue counting the bar code marks and wherein said transfer unit adds the previously counted bar code marks of the first sensor with the marks counted by the second sensor to determine the position of the moving machine part.

* * * * *